United States Patent [19]

Kuhlen

[11] Patent Number: 5,105,663

[45] Date of Patent: Apr. 21, 1992

[54] APPARATUS AND METHOD FOR MEASURING LOW FUEL LEVEL IN A FUEL TANK

[75] Inventor: Ernst Kuhlen, Willich, Fed. Rep. of Germany

[73] Assignee: Pierburg GmbH, Leuschstrasse, Fed. Rep. of Germany

[21] Appl. No.: 299,967

[22] Filed: Jan. 19, 1989

[30] Foreign Application Priority Data

Jan. 19, 1988 [DE] Fed. Rep. of Germany ....... 3801254

[51] Int. Cl.$^5$ ..................... F02M 37/14; G01F 23/36
[52] U.S. Cl. ..................... 73/308; 137/582; 340/623; 417/36
[58] Field of Search ............... 73/308, 307, 306, 301; 137/582; 340/623

[56] References Cited

U.S. PATENT DOCUMENTS

| 965,634 | 7/1910 | Judevine | 137/582 X |
|---|---|---|---|
| 2,514,632 | 7/1950 | Flubecker | 417/38 |
| 3,173,469 | 3/1965 | Shockey | 137/582 X |
| 3,782,414 | 1/1974 | Holbrook | 137/582 X |
| 4,649,968 | 3/1987 | Berrettini et al. | 73/301 X |

FOREIGN PATENT DOCUMENTS 54-125855 9/1979 Japan ..................... 137/582

Primary Examiner—Daniel M. Yasich
Attorney, Agent, or Firm—Ladas & Parry

[57] ABSTRACT

A method and apparatus for measuring low fuel level in a fuel tank having a fuel pump with an anti-slosh pot supplied with fuel from a predelivery pump in the fuel pump. Fuel measurement is effected by sensing delivery of air to the anti-slosh put by the predelivery pump when the fuel level in the tank is low, and measuring the amount of fuel in the anti-slosh pot when delivery of air is sensed. The amount of fuel measured in the anti-slosh pot accurately represents the amount of fuel remaining in the fuel tank.

12 Claims, 1 Drawing Sheet

APPARATUS AND METHOD FOR MEASURING LOW FUEL LEVEL IN A FUEL TANK

FIELD OF THE INVENTION

The present invention relates to a liquid level indicator device for the fuel tank of a motor vehicle in which a float system is arranged in the tank and acts on a signal transmitter.

The present invention relates in particular to the measurement of the fuel level in a fuel tank which is almost empty.

The invention also relates to a method of measuring the amount of fuel in a fuel tank when the tank is almost empty.

DESCRIPTION OF PRIOR ART

Apparatus for indicating the fuel level in a tank is known by which it is attempted to determine and signal the remaining amount of fuel even when the fuel is distributed over a relatively large area in a flat fuel tank. Such apparatus, however, is generally inaccurate and is only able to detect residual amounts of more than about 5-8 liters of fuel and furthermore, it is subject to large variations due to travel of the motor vehicle. for example. during braking. travel around curves, up and down grades, and the like.

A fuel delivery system is disclosed in DE-OS 35 32 349 in which a so-called anti-slosh pot which is supplied with fuel by a predelivery pump is used to obviate disturbing undulations of the fuel by the travel movements of the motor vehicle.

SUMMARY OF THE INVENTION

Starting from the conventional delivery system in DE-OS 35 32 349, an object of the present invention is to provide a fuel-level indicator device of this type by which a precise determination of the remaining amount of fuel is possible even upon abrupt movements of the vehicle.

In accordance with the above and further objects of the invention. the fuel level indicator device comprises means for determining when the fuel tank is almost empty, means in an anti-slosh pot for determining the amount of fuel therein, and means for supplying a signal to an evaluation-indicator device corresponding to the determined amount of fuel in the anti-slosh pot when the fuel tank is determined to be almost empty.

In further accordance with the invention, the means for determining the amount of fuel in the anti-slosh pot comprises a pressure sensor at the lowest point of the anti-slosh pot.

In still further accordance with the invention, a predelivery pump is arranged in the tank for delivery of fuel to the anti-slosh pot, and the means for determining when the fuel tank is almost empty comprises a pressure sensor responsive to pressure difference between atmospheric pressure and the delivery pressure of the pre-delivery pump, the latter said pressure sensor being arranged in the anti-slosh pot at the highest point thereof.

A further object of the invention is to provide a method by which the determination of an almost empty fuel tank can be made with accuracy and without substantial influence by the movement of the vehicle.

In accordance with the above, the invention is directed to a method comprising sensing delivery of air to the anti-slosh pot by the pre-delivery pump which occurs when the fuel level in the tank is relatively low and measuring the amount of fuel in the anti-slosh pot when delivery of air is sensed in the anti-slosh pot, the amount of fuel measured in the anti-slosh pot accurately representing the amount of fuel remaining in the fuel tank.

In further accordance with the invention, the method comprises additionally producing a signal when the pressure in the anti-slosh pot drops, producing a signal indicating the amount of fuel in the anti-slosh pot, and supplying the signal indicating the amount of fuel in the anti-slosh pot to an evaluation-indicator device when the signal is produced indicating that the pressure in the anti-slosh pot has dropped.

The signal indicating drop of pressure in the anti-slosh pot is utilized to connect the signal indicating the amount of fuel in the anti-slosh pot to the evaluation-indication device.

The signal indicating drop in pressure in the anti-slosh pot is utilized after a time delay.

DETAILED DESCRIPTION OF A PREFERRED EMBODIMENT

Figure 1:
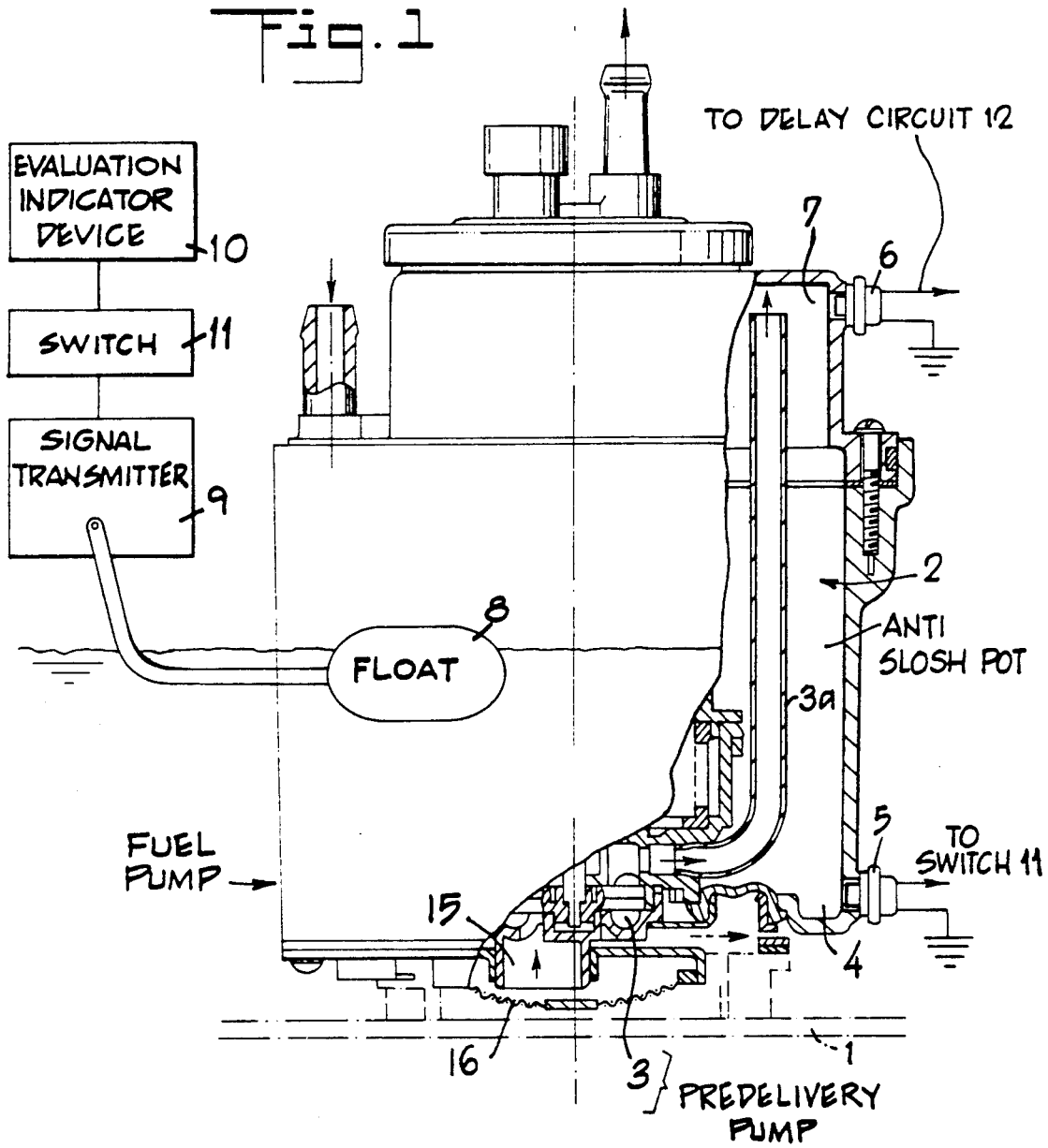
FIG. 1 of the drawing shows a conventional fuel tank, partly broken away and in sections, incorporating one embodiment according to the invention.
Figure 2:
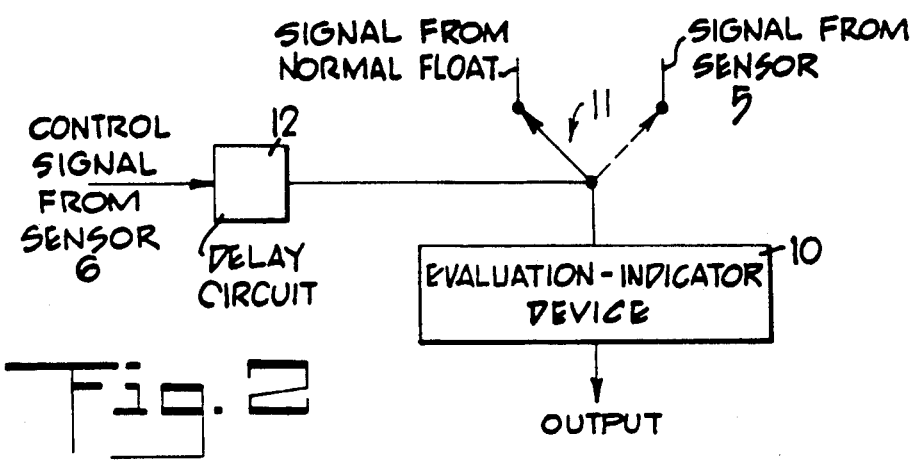
FIG. 2 is a schematic illustration of the connections to an evaluation-indicating device.

FIG. 1 of the drawing shows a portion of a fuel tank 1 of a motor vehicle. In the fuel tank 1 is a liquid level sensing device consisting of a conventional float 8 which acts on an electric signal transmitter. Also arranged in tank 1 is a fuel pump containing a conventional so-called "antislosh pot" 2. The anti-slosh pot is supplied with fuel from the tank 1 by a predelivery pump 3 via a lower inlet 15 covered by a filter screen 16. At the lowest point 4 of the anti-slosh pot 2 is a pressure sensor 5 and at the highest point 7 of the anti-slosh pot is a pressure sensor 6.

The signal transmitter 9 and the pressure sensors 5, 6 are connected by electric wires to a conventional evaluation-indicator device 10 which produces an acoustic and/or optical signal when low fuel is detected.

In operation, the conventional float system indicates the level of the fuel via the transmitter 9 and the evaluation-indicator device. When the fuel level in tank 1 has dropped so low that the predelivery pump 3 pumps air from the fuel tank 1, a riser pipe 3a serves to vent a space in the anti-slosh pot 2 located above the outlet of the pipe 3a. In this way, the predelivery pressure present in the anti-slosh pot 2 which has been produced by the predelivery pump 3 drops to atmospheric pressure. The pressure sensor 6 which is arranged at the highest point 7 changes its signal accordingly, as a result of which the evaluation-indicator device is switched by switch 11 to the dotted position respond to the signal present at the sensor 5. The signal from sensor 6 is supplied to the evaluation-indicator 10 device after a predetermined period of delay due to the provision of a conventional delay circuit 12 in order to make certain that the pressure change is not merely a temporary accidental drawing-in of air.

The pressure sensor signal at sensor 5 changes in accordance with the varying level of filling in the antislosh pot 2, whereby there is present an accurate signal, due to high resolution, for the residual amount of fuel contained in the anti-slosh pot 2, which signal is output by the evaluation-indicator device 10.

In an alternative arrangement, the function of the pressure sensor 6 can also be carried out by the pressure sensor 5 arranged at the lower point 4. In this regard when the pressure at sensor 5 drops below a determined value, the switch 11 is operated to connect the evaluation-indication device to sensor 5.

In another alternative arrangement, the filling level in the anti-slosh pot 2 can be determined by a conventional float system instead of the lower pressure sensor 5.

With the invention there is obtained a high accuracy of the indication of the residual amount of fuel contained in the fuel tank and the anti-slosh pot since, due to the greater height of filling in the anti-slosh pot, there is high resolution of the pressure signal from sensor 5 and/or the signal provided by the alternative float system.

Although the invention has been described in relation to a specific embodiment thereof, it will become apparent to those skilled in the art that numerous modifications and variations can be made within the scope and spirit of the invention as defined in the attached claims.

What is claimed is:

1. A fuel level indicator device for a fuel tank of a motor vehicle having a float system in the tank acting on a signal transmitter connected to an evaluation-indicator device, and a fuel pump in the tank at a bottom wall thereof, the fuel pump containing an anti-slosh pot supplied with fuel from a predelivery pump, said fuel level indicator device comprising means for determining when the fuel tank is almost empty, means in the anti-slosh pot for determining the amount of fuel in the anti-slosh pot, and means for supplying a signal to the evaluation-indicator device corresponding to the determined amount of fuel in the anti-slosh pot when the fuel tank is determined to be almost empty.

2. A device as claimed in claim 1 wherein said means for determining the amount of fuel in the anti-slosh pot comprises a pressure sensor in said anti-slosh pot at the lowest point thereof.

3. A device as claimed in claim 1 wherein a predelivery pump is arranged in the fuel pump for delivery of fuel to the anti-slosh pot, said means for determining when the fuel tank is almost empty comprises a pressure sensor responsive to pressure difference between atmospheric pressure and the delivery pressure of said predelivery pump, said pressure sensor being arranged in the anti-slosh pot at the highest point thereof.

4. A device as claimed in claim 3 comprising a delay circuit connecting said pressure sensor to the evaluation-indicator device.

5. A device as claimed in claim 4 comprising a switch means for switching an input of the evaluation-indicator device to the means for determining the amount of fuel in the anti-slosh pot when it is determined that the fuel tank is almost empty.

6. In a method for measuring the fuel level in a fuel tank having a fuel pump with an anti-slosh pot supplied with fuel from a predelivery pump in the fuel pump, the improvement comprising sensing delivery by the predelivery pump of air to the anti-slosh post when the fuel level in the tank is low and an inlet of the fuel pump is supplied with air, and measuring the amount of fuel in the anti-slosh pot when delivery of air is sensed in the anti-slosh pot, the amount of fuel measured in the anti-slosh pot representing the amount of fuel remaining.

7. A method as claimed in claim 6 wherein the delivery of air is sensed by a drop of pressure in the anti-slosh pot.

8. A method as claimed in claim 7 comprising producing a signal when the pressure in the anti-slosh pot drops due to air therein, producing a signal indicating the amount of fuel in the anti-slosh pot, and supplying the signal indicating the amount of fuel in the anti-slosh pot to an evaluation-indication device when the signal is produced indicating that the pressure in the anti-slosh pot has dropped.

9. A method as claimed in claim 8 wherein the signal indicating drop in pressure in the anti-slosh pot is utilized to connect the signal indicating the amount of fuel in the anti-slosh pot to the evaluation-indication device.

10. A method as claimed in claim 9 wherein the signal indicating drop in pressure in the anti-slosh pot is utilized after a time delay.

11. A method as claimed in claim 7 wherein the drop of pressure in the anti-slosh pot is due to venting of a space in the anti-slosh pot to atmospheric pressure upon delivery of air.

12. A method as claimed in claim 6 wherein the amount of fuel is measured in the anti-slosh pot by measuring the pressure in the anti-slosh pot at the bottom thereof.

* * * * *